United States Patent
McConkey et al.

(10) Patent No.: US 12,292,338 B2
(45) Date of Patent: May 6, 2025

(54) TURBINE INLET TEMPERATURE CALCULATION USING ACOUSTICS

(71) Applicant: Siemens Energy, Inc., Orlando, FL (US)

(72) Inventors: Joshua S. McConkey, Orlando, FL (US); Tao Cui, Princeton Junction, NJ (US); Zainul Momin, Austin, TX (US)

(73) Assignee: SIEMENS ENERGY, INC., Orlando, FL (US)

( * ) Notice: Subject to any disclaimer, the term of this patent is extended or adjusted under 35 U.S.C. 154(b) by 326 days.

(21) Appl. No.: 17/772,170

(22) PCT Filed: Dec. 19, 2019

(86) PCT No.: PCT/US2019/067332
§ 371 (c)(1),
(2) Date: Apr. 27, 2022

(87) PCT Pub. No.: WO2021/126196
PCT Pub. Date: Jun. 24, 2021

(65) Prior Publication Data
US 2022/0381626 A1  Dec. 1, 2022

(51) Int. Cl.
*G01K 11/26*  (2006.01)
*G01K 13/024*  (2021.01)

(52) U.S. Cl.
CPC ............ *G01K 11/26* (2013.01); *G01K 13/024* (2021.01)

(58) Field of Classification Search
CPC .............................. G01K 11/26; G01K 13/024
See application file for complete search history.

(56) References Cited

U.S. PATENT DOCUMENTS

| | | | |
|---|---|---|---|
| 10,355,664 B2 | 7/2019 | Patel et al. | |
| 2008/0159353 A1 | 7/2008 | Bosselmann et al. | |
| 2009/0245323 A1 | 10/2009 | Brummel et al. | |
| 2014/0238033 A1* | 8/2014 | Crothers | F02C 9/18 60/725 |
| 2014/0278200 A1 | 9/2014 | DeSilva | |
| 2015/0168228 A1 | 6/2015 | DeSilva | |
| 2017/0342913 A1* | 11/2017 | Feulner | F02C 9/48 |
| 2018/0012616 A1 | 1/2018 | Salishev et al. | |
| 2024/0094067 A1* | 3/2024 | Demers | G01L 3/24 |

FOREIGN PATENT DOCUMENTS

| | | |
|---|---|---|
| CN | 101023334 A | 8/2007 |
| EP | 1602904 A1 | 12/2015 |
| EP | 3249199 A1 | 11/2017 |
| RU | 2665142 C1 | 8/2018 |

OTHER PUBLICATIONS

PCT International Search Report and Written Opinion of International Searching Authority mailed Aug. 27, 2020 corresponding to PCT International Application No. PCT/US2019/067332 filed Dec. 19, 2019.

* cited by examiner

Primary Examiner — Randy W Gibson

(57) ABSTRACT

A method of determining a turbine inlet temperature for a gas turbine engine includes measuring pressure changes within a combustion section of the gas turbine engine during operation of the gas turbine engine to produce pressure versus time data, extracting a resonant frequency from the pressure versus time data, and calculating the turbine inlet temperature based solely on the resonant frequency.

20 Claims, 9 Drawing Sheets

TURBINE INLET TEMPERATURE CALCULATION USING ACOUSTICS

BACKGROUND

Gas turbine engines operate at high temperatures to improve thermal efficiency and to reduce undesirable emissions. One of the highest temperature areas in the gas turbine engine is the area near the turbine inlet. Typical temperatures in this area are high enough that most temperature measuring sensors cannot operate for long periods of time.

BRIEF SUMMARY

A method of determining a turbine inlet temperature for a gas turbine engine includes measuring pressure changes within a combustion section of the gas turbine engine during operation of the gas turbine engine to produce pressure versus time data, extracting a resonant frequency from the pressure versus time data, and calculating the turbine inlet temperature based solely on the resonant frequency.

In another construction, a method of determining a turbine inlet temperature for a gas turbine engine includes positioning a dynamic pressure sensor within a combustion section, positioning a temperature sensor in a position suited to measuring the turbine inlet temperature, and measuring pressure changes with the dynamic pressure sensor to produce pressure versus time data. The method also includes measuring the turbine inlet temperature using the temperature sensor to generate temperature versus time data, determining a resonant frequency based on the pressure versus time data, using the resonant frequency and the temperature versus time data to determine the value for at least one constant in a polynomial equation, and calculating the turbine inlet temperature using the polynomial equation and based solely on the resonant frequency.

In yet another construction, a gas turbine engine includes a combustion section operable to combust a fuel to produce an exhaust gas, a turbine section coupled to the combustion section and operable to receive the exhaust gas, the turbine section defining a turbine inlet having a turbine inlet temperature, and a dynamic pressure sensor positioned in the combustion section and operable to measure pressure fluctuations. The engine also includes a computer system coupled to the dynamic pressure sensor to receive pressure versus time data. The computer system includes a processor and a memory storing instructions that, when executed by the processor, configure the apparatus to extract a resonant frequency from the pressure versus time data and calculate the turbine inlet temperature based solely on the resonant frequency.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
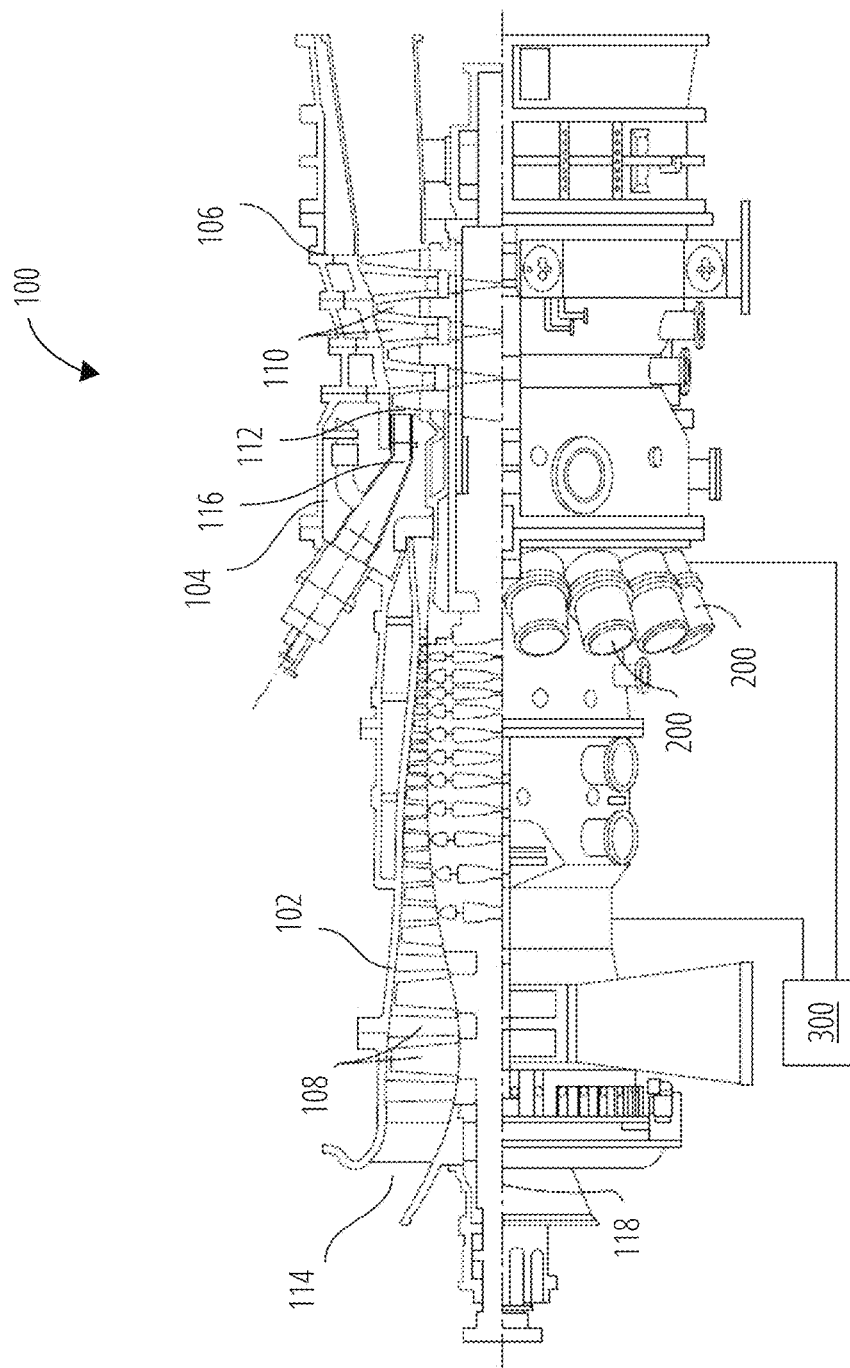
FIG. 1 is a cross-sectional longitudinal view of a gas turbine engine.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus.

It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

FIG. 1 illustrates an example of a gas turbine engine 100 including a compressor section 102, a combustion section 104, and a turbine section 106. The compressor section 102 includes a plurality of compressor stages 108 with each stage including a set of rotating blades and a set of stationary or adjustable guide vanes. The compressor section 102 is in fluid communication with an inlet section 114 to allow the gas turbine engine 100 to draw atmospheric air into the compressor section 102. During operation of the gas turbine engine 100, the compressor section 102 draws in atmospheric air and compresses that air for delivery to the combustion section 104.

In the illustrated construction, the combustion section 104 includes a plurality of separate combustors 200 that each operate to mix a flow of fuel with the compressed air from the compressor section 102 and to combust that air-fuel mixture to produce a flow of high temperature, high pressure combustion gases or exhaust gas 116. Of course, many other arrangements of the combustion section 104 are possible.

The turbine section 106 includes a plurality of turbine stages 110 with each stage including a number of rotating blades and a number of stationary blades or vanes. The turbine stages 110 are arranged to receive the exhaust gas 116 from the combustion section 104 at a turbine inlet 112 and expand that gas to convert thermal and pressure energy into rotating or mechanical work. The turbine section 106 is connected to the compressor section 102 to drive the compressor section 102. For gas turbine engines used for power generation or as prime movers, the turbine section 106 is also connected to a generator, pump, or other device to be driven.

A control system 300 is coupled to the gas turbine engine 100 and operates to monitor various operating parameters and to control various operations of the gas turbine engine 100. In preferred constructions the control system 300 is typically micro-processor based and includes memory devices and data storage devices for collecting, analyzing, and storing data. In addition, the control system 300 provides output data to various devices including monitors, printers, indicators, and the like that allow users to interface with the control system 300 to provide inputs or adjustments. In the example of a power generation system, a user may input a power output set point and the control system 300 adjusts the various control inputs to achieve that power output in an efficient manner.

The control system 300 can control various operating parameters including, but not limited to variable inlet guide vane positions, fuel flow rates and pressures, engine speed, valve positions, and generator load. Of course, other applications may have fewer or more controllable devices. The control system 300 also monitors various parameters to assure that the gas turbine engine 100 is operating properly. Some parameters that are monitored may include inlet air temperature, compressor outlet temperature and pressure, combustor outlet temperature, fuel flow rate, generator power output, and the like. Many of these measurements are displayed for the user and are logged for later review should such a review be necessary. It is also desirable to determine a turbine inlet temperature. However, as will be discussed in greater detail, this temperature is difficult to directly measure.

Figure 2:
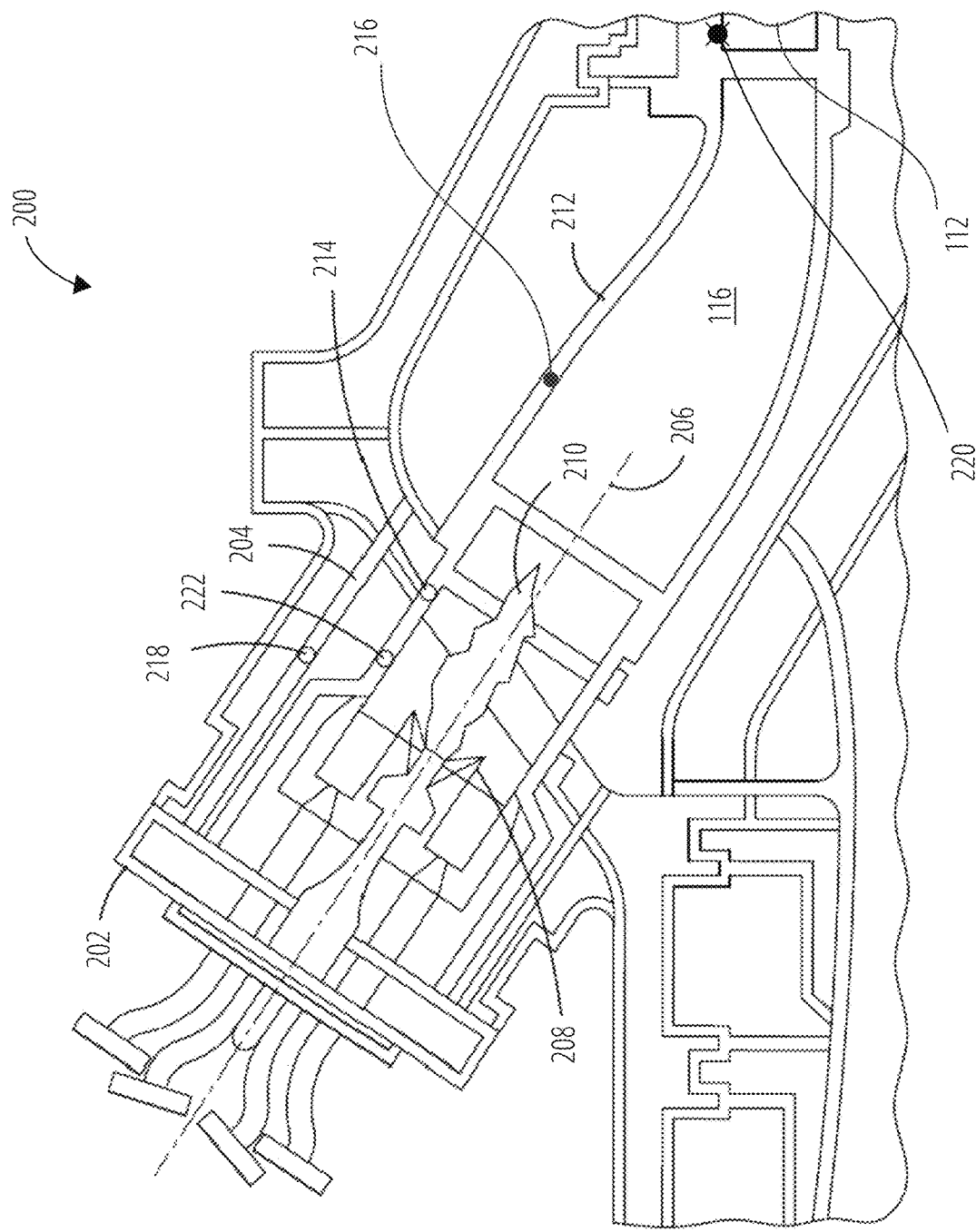
FIG. 2 is a cross-sectional view of a combustor of the gas turbine engine of FIG. 1.

FIG. 2 is an enlarged cross-sectional view of one of the combustors 200 of the gas turbine engine 100 of FIG. 1. Each combustor 200 includes a top hat section 202, at least one flame tube 208, a combustor basket 204, and a transition piece 212. The top hat section 202 attaches to the gas turbine engine 100 and supports any piping and valves necessary to direct fuel into the combustor 200. The combustor basket 204 extends from the top hat section 202 toward the turbine section 106 and defines a long axis 206 that is arranged at an oblique angle with respect to a central axis 118 of the gas turbine engine 100. The combustor basket 204 operates as a liner to separate the combustion zone of the combustor 200 from the exterior walls of the gas turbine engine 100. At least one flame tube 208, and in many cases multiple flame tubes 208 are disposed within the combustor basket 204. The flame tubes 208 expel a flow of fuel and air that is ignited to form one or more flames 210 within the combustor basket 204. The combustor basket 204 includes a plurality of apertures (not shown) that allow additional air into the combustion area to assure complete combustion and to cool the combustion gases before they are discharged to the turbine section 106. The transition piece 212 is positioned adjacent the combustor basket 204 to receive the combustion gases and direct them efficiently to the turbine inlet 112.

With continued reference to FIG. 2, a first dynamic pressure sensor 214 is positioned at an outlet end of the combustor basket 204 and a second dynamic pressure sensor 216 is positioned in the transition piece 212 downstream of the first dynamic pressure sensor 214. The dynamic pressure sensors 214, 216 are operable to detect small and rapid pressure changes associated with auditory changes within the combustor 200. While two sensors 214, 216 are illustrated, only one is required to detect the desired pressure fluctuations. In other constructions, these sensors 214, 216 can be positioned in the top hat section 202 or in other areas of the combustor 200. The actual position and quantity of sensors required can vary with the design of the combustor, as small design changes can have a large effect on the acoustic environment.

Other sensors 222, such as other acoustic sensors, low frequency pressure sensors, temperature sensors 218, optical sensors, or ionization sensors, alone or in some combination can be configured to detect physical phenomena in at least a portion of the gas flow. In some embodiments, there are multiple actuators or sensors or both, collectively called transducers.

The dynamic pressure sensors 214, 216 receive acoustic oscillations generated within the combustor basket 204 and convert those oscillations into signals that can be analyzed by the control system 300 or another system. In other embodiments, different acoustic transducers in the same or different one or more locations sensitive to acoustic phenomena in the combustor basket 204 are used. In some constructions, the pressure sensors 214, 216 are positioned upstream of the flame 210. This location is colder than the sensor location shown in FIG. 2.

There are dynamic pressure sensors 214, 216 mounted on each combustor basket 204 in a can-annular combustor system or a few in the annulus in the case of an annular chamber. From the results obtained by advanced data acquisition systems, these sensors 214, 216 are sensitive enough to pick up the sound created by numerous events and operational changes in the gas turbine engine 100.

It should be noted that the first dynamic pressure sensor 214 and the second dynamic pressure sensor 216 are typically located as shown in FIG. 2. However, other locations or additional sensors could be employed depending upon what is being analyzed. These sensors 214, 216 are typically installed to monitor operating characteristics not necessarily related to the turbine inlet temperature.

FIG. 2 also illustrates a temperature sensor 220 positioned adjacent the turbine inlet 112. While the temperature sensor 220 is capable of directly measuring the turbine inlet temperature, the temperature in this region (often 1600 degrees C. or greater) during operation quickly damages and destroys the temperature sensor 220. Thus, long term use of this temperature sensor 220 to measure the turbine inlet temperature is generally not possible or is not cost effective.

Figure 3:
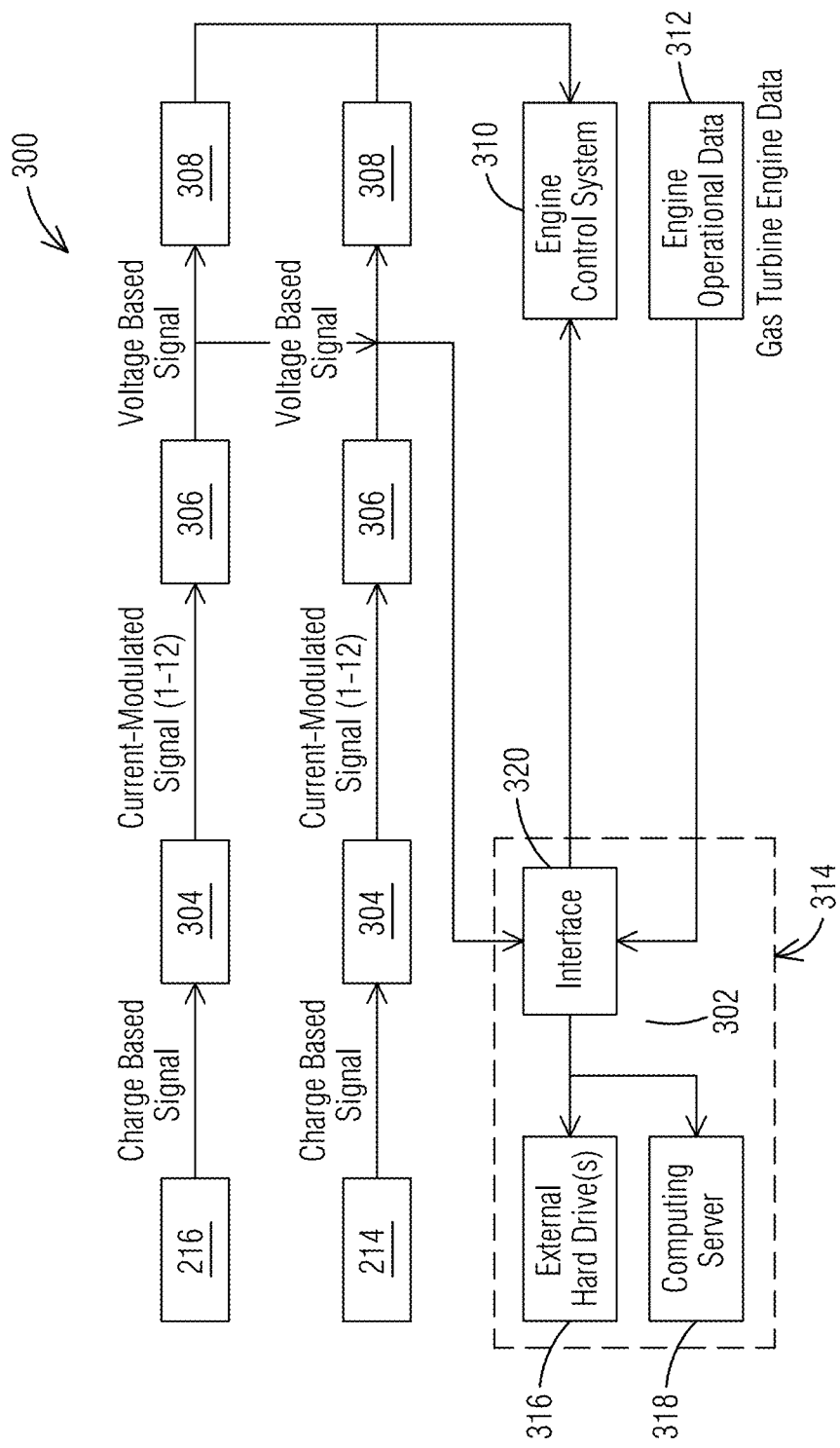
FIG. 3 is a schematic illustration of a control system operable to control the operation of the gas turbine engine of FIG. 1.

FIG. 3 illustrates a portion of the control system 300 operable to control the operation of the gas turbine engine 100 as well as to determine, estimate, or calculate the turbine inlet temperature. As is typically included with a current gas turbine engine 100, FIG. 3 illustrates a first dynamic pressure sensor 214, a second dynamic pressure sensor 216, an engine control 310 and an engine operating data storage unit 312 or other storage device suited for use in the storage of operational data.

As discussed, each of the first dynamic pressure sensor 214 and the second dynamic pressure sensor 216 are positioned within the combustion section 104 and are arranged to measure rapid pressure changes that are acoustic pressure changes. The first dynamic pressure sensor 214 measures pressure changes during operation and generates a signal indicative of the measured pressure variations. The signal is then directed to an amplifier 304 or other conditioning circuits that condition the signal to make it suitable for use. In the case of FIG. 3, the signal is amplified to produce an amplified signal. The amplified signal is then directed to an isolator 306 that operates to isolate the sensitive amplifier 304 and first dynamic pressure sensor 214 from stray voltages or currents that might cause damage. One suitable isolator 306 is a galvanic separator. In other constructions, a transformer, optical isolation, capacitors, Hall effect devices, and the like may be suitable for use as the isolator 306.

After passing through the isolator 306 the signal passes to a sensor monitor 308 for further analysis, storage, or passage to the engine control 310. The second dynamic pressure sensor 216 produces a signal that follows a path through similar components as just described with regard to the first dynamic pressure sensor 214.

The engine control 310 gathers operating data, including pressures, temperatures, speeds, fuel flows, and the like to allow for the accurate and efficient control and operation of the gas turbine engine 100. Some or all the collected operating data is directed to the operating data storage unit 312 where it can be stored for later use, accessed by other systems, archived, transmitted, or otherwise utilized.

The components described with regard to FIG. 3 to this point are included with most operating gas turbine engines. Of course, additional sensors, controls, or other devices could be, and typically are also included. FIG. 3 also illustrates a turbine inlet temperature calculation system 314 that includes a computer system 302. The computer system 302 includes an interface 320, computing server 318, and data storage 316 that together are capable of operating to calculate the turbine inlet temperature for the gas turbine engine 100 of FIG. 1.

In order to calculate the turbine inlet temperature, the signal from each isolator 306 is provided to the computer system 302. Preferably, the signal is sampled at a rate of at least 5 kHz to assure the needed accuracy, with some constructions sampling over 20 kHz.

Figure 4:
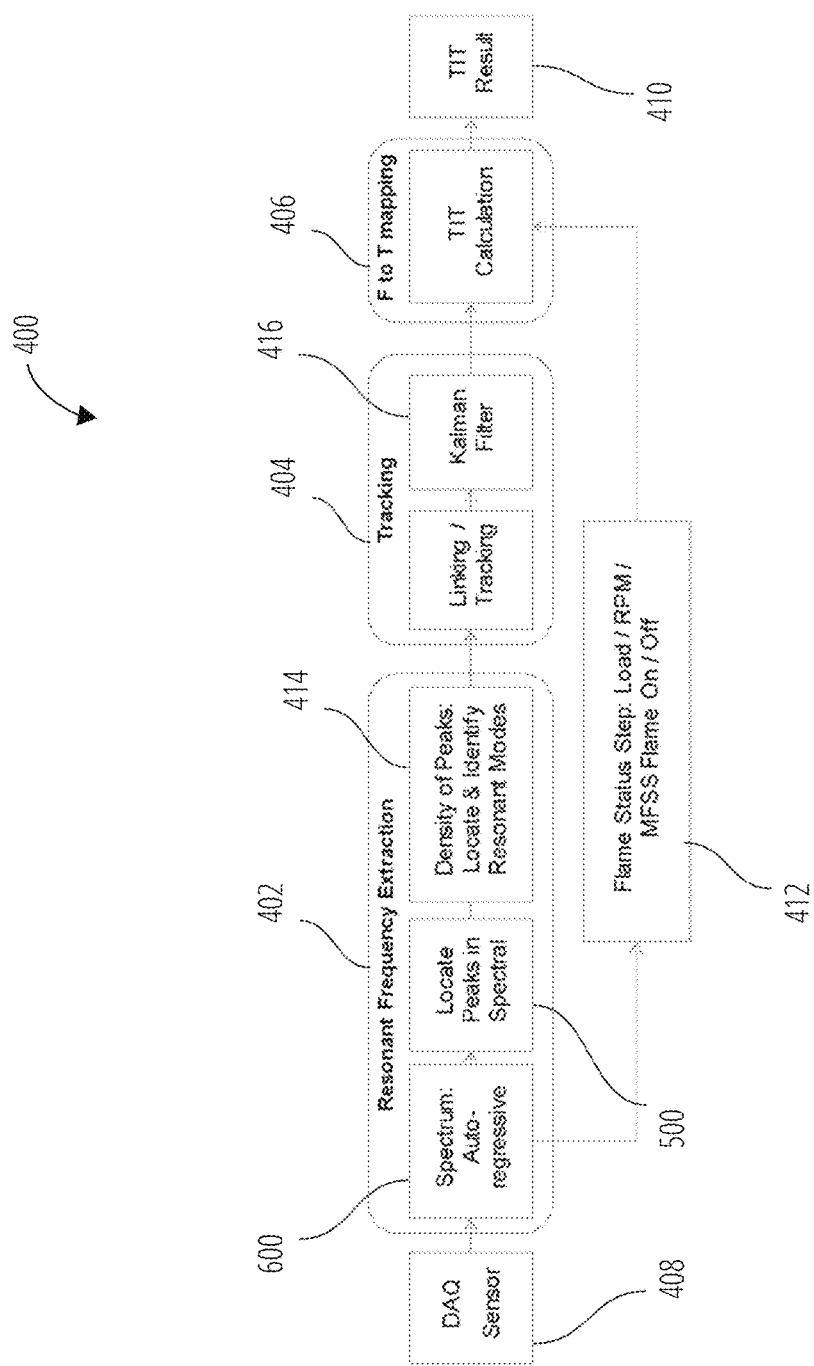
FIG. 4 is a flow chart illustrating the operation of a turbine inlet temperature calculation module operable with the control system of FIG. 3 to determine the turbine inlet temperature for the gas turbine engine of FIG. 1.

FIG. 4 illustrates a turbine inlet temperature calculation module 400 that includes various steps performed by the computer system 302 to calculate the turbine inlet temperature using only the data provided by one or both of the dynamic pressure sensors 214, 216. The steps include a resonant frequency extraction step 402, a tracking step 404, and a frequency to temperature mapping step 406. Sensor data 408 from one or more of the dynamic pressure sensors 214, 216 is fed to the resonant frequency extraction step 402 and the turbine inlet temperature result 410 is output from the frequency to temperature mapping step 406. In preferred constructions, the turbine inlet temperature result 410 is in the form of a temperature versus time trace or can just include a readout of the current turbine inlet temperature.

In some constructions, an operational check step 412 can be performed before initiating the turbine inlet temperature calculation module 400. The operational check step 412 can determine if the gas turbine engine 100 is operating, is at or above a particular load, is operating at a particular speed, or can check any other parameters before initiating the turbine inlet temperature calculation module 400. In some operating modes, the accuracy of the turbine inlet temperature result 410 may not be as high as desirable. The operational check step 412 can be used to disable the turbine inlet temperature calculation module 400 when running in these modes.

Figure 6:
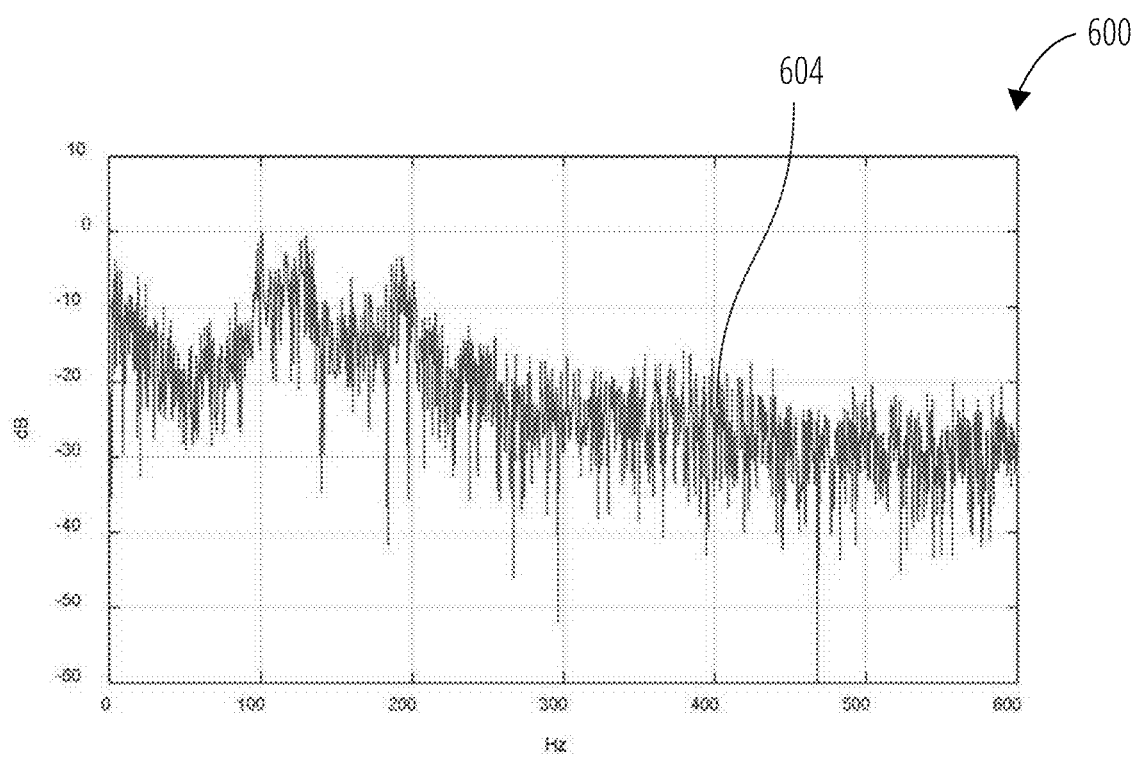
FIG. 6 includes two plots illustrating two results generated using two different spectrum determination methods.
Figure 6:
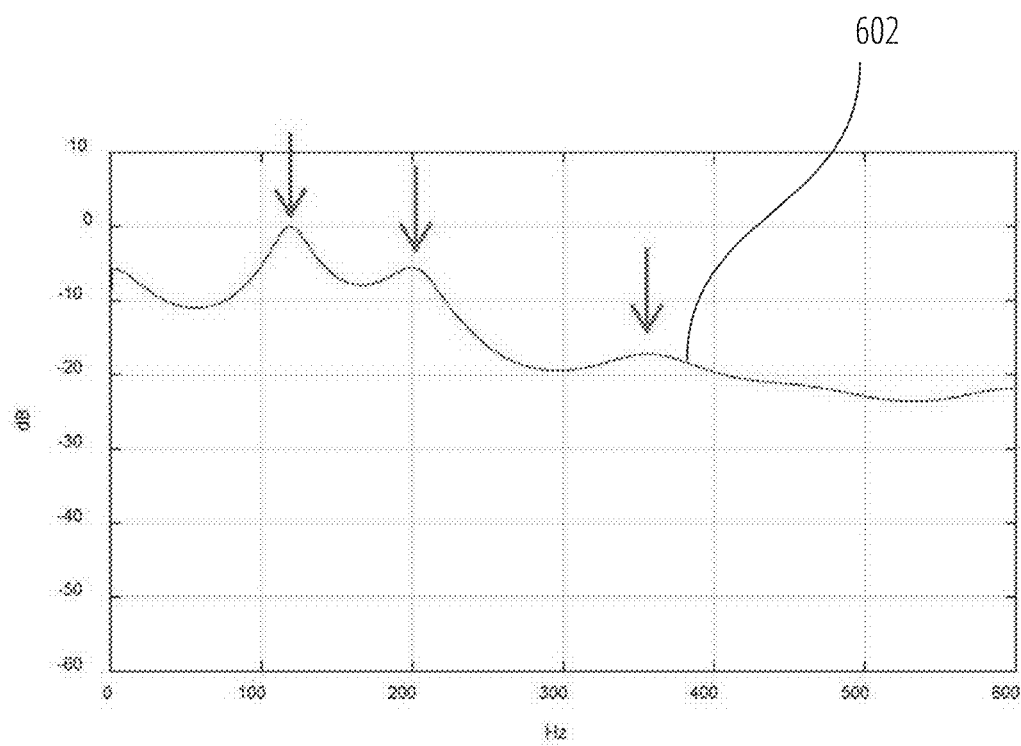

The resonant frequency extraction step 402 includes a spectrum determination step 600, a peak location step 500, and a peak density analysis step 414. In the spectrum determination step 600, the turbine inlet temperature calculation module 400 receives sensor data 408 in the form of amplitude vs time data. The amplitude vs time data is converted to the frequency domain such that frequency versus amplitude data is available for analysis. Preferred systems employ an auto regressive power spectral density analysis in the spectrum determination step 600 that converts the sensor data 408 to the frequency domain and produces auto regressive PSD results 602 as shown in FIG. 6. Of course, other systems could use other techniques or methods including Fast Fourier Transforms (FFT) and the like. As illustrated in FIG. 6, the auto regressive PSD results 602 are superior to the FFT results 604 produced using a standard FFT.

Figure 5:
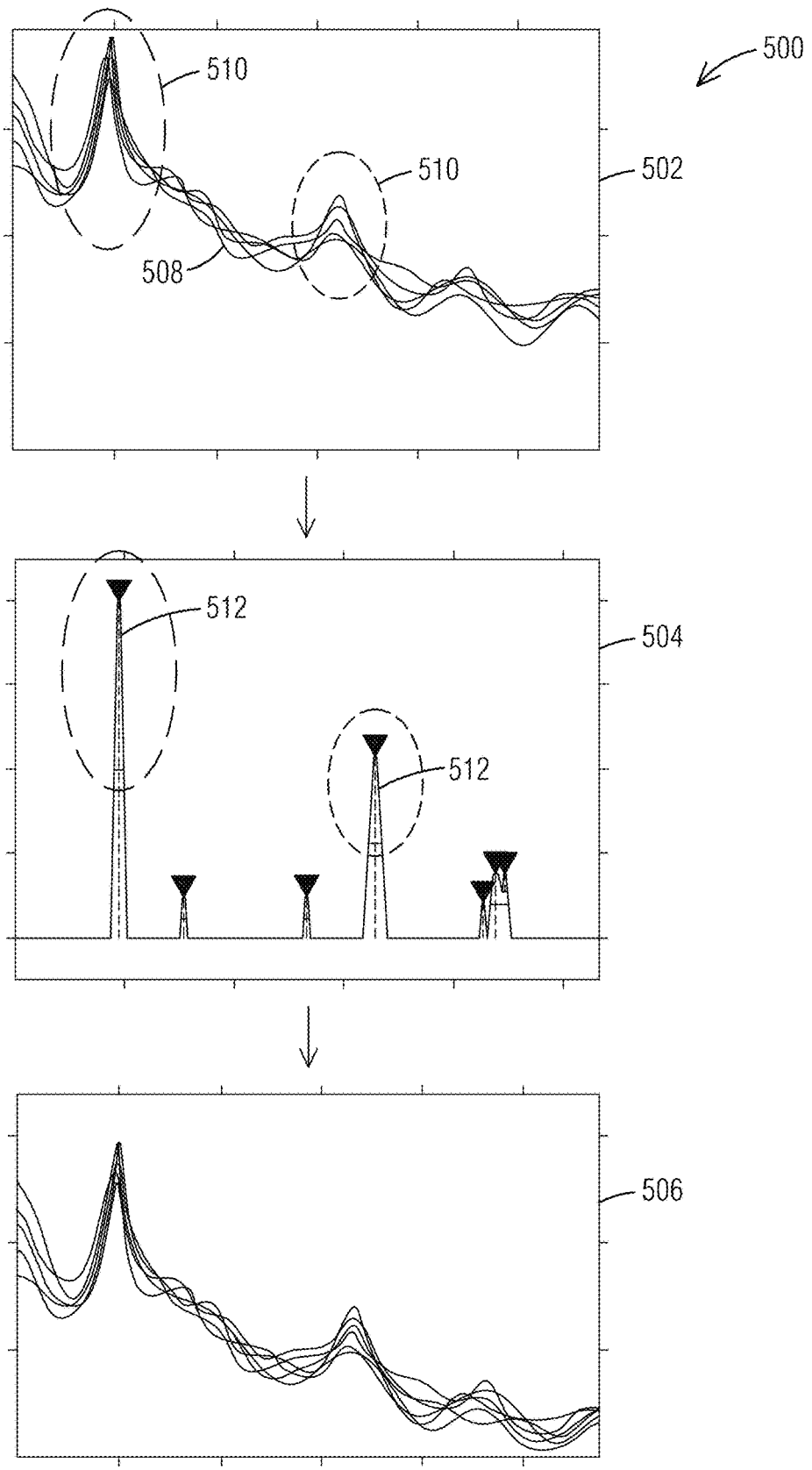
FIG. 5 is a series of plots illustrating a peak location step of the turbine inlet temperature calculation module.

The peak location step 500 and the tracking step 404, illustrated in FIG. 5 operate to determine the frequency of any resonant frequencies contained in the frequency versus amplitude data 508 and to track those frequencies. In the first plot 502 of FIG. 5, the peak location step 500 utilizes an unsupervised learning method to locate the resonant frequencies within the frequency versus amplitude data 508 and to define baskets 510 around each of the resonant frequencies. A kernel density estimator uses the defined baskets 510 as inputs to calculate the location of those resonant frequencies. Each peak 512 in the second plot 504 of FIG. 5 represents the result from the kernel density estimator with the width of each peak 512 representing the disbursement or spread of the values around the center of the peak 512.

Once the frequencies are identified, the tracking step 404 tracks the location of each peak 512 as illustrated in the third plot 506. The output of the tracking step 404 can be a trace of the resonant frequency versus time 700 for each peak 512 identified in the peak location step 500. In order to track each peak 512 and complete the desired trace of the resonant frequency versus time 700, a filter 416 is applied. In the illustrated construction, a Kalman filter 416 is used as the filter. A Kalman filter 416 has the advantage of always providing a value such that the filter 416 can fill in missing data or remove bad data where there are interruptions or other problems that may create gaps in the data. Of course, other filters and filtering methods could be employed to achieve the desired results.

Figure 7:
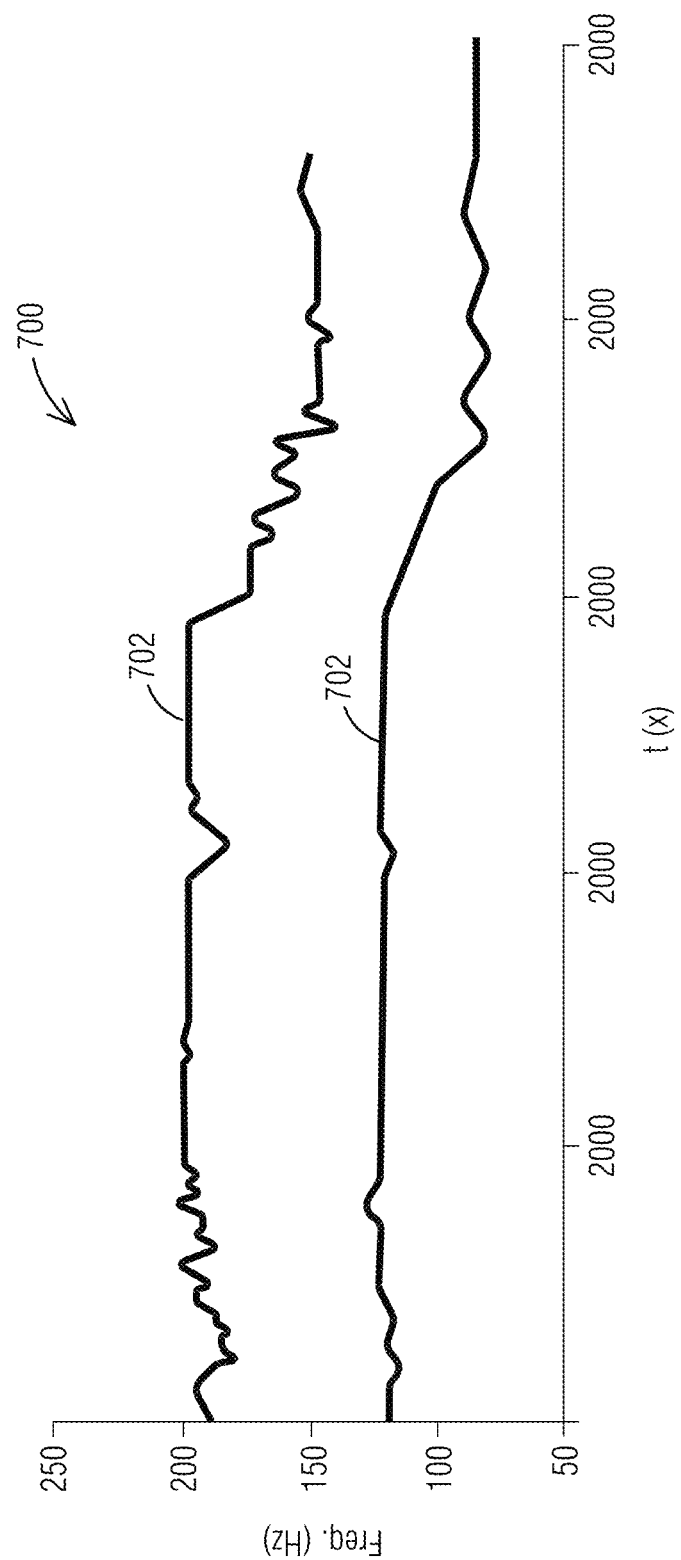
FIG. 7 is a plot showing a trace of the resonant frequency versus time calculated by the turbine inlet temperature calculation module.

With the trace of the resonant frequency versus time 700 now available as illustrated in FIG. 7, the computer system 302 can perform the frequency to temperature mapping step 406. The following equation is used to calculate the turbine inlet temperature at each time step using only one of the resonant frequencies 702.

$$T=af^2+bf+c$$

In the above equation, T is the turbine inlet temperature, f is the resonant frequency and a, b, and c are constants that must be determined prior to implementation of the turbine inlet temperature calculation module 400. One method suitable for use in determining the constants involves the use of the temperature sensor 220 positioned near the turbine inlet 112. The temperature sensor 220 measures the actual turbine inlet temperature during operation while the first dynamic pressure sensor 214 measures the pressure values. With both the temperature and the resonant frequency known, one can solve the above equation to determine the optimum values for a, b, and c. Not all gas turbine engines 100 include a temperature sensor 220 near the turbine inlet 112, and those that do, often experience a failure of the temperature sensor 220 after a short operating period due to the very high temperature in this location. Thus, this process is used while the temperature sensor 220 is available to determine the values of a, b, and c.

It should be noted that each gas turbine engine is different such that the values for one turbine may not be suitable for another gas turbine engine. In addition, many gas turbine engines include multiple combustors 200 and each of the combustors 200 has slight differences that may require different values for a, b, and c for each of the combustors 200. In addition, in some applications a different equation, including higher-order polynomials or equations in other forms may be more suitable for a particular gas turbine engine or one or more of the combustors 200.

For gas turbine engines 100 that do not have a suitable temperature sensor 220 near the turbine inlet 112, a heat balance can be used to determine the values of the constants a, b, and c. The heat balance predicts expected turbine inlet temperature values under various operating conditions. Thus, one would operate the gas turbine engine 100 at those conditions and measure the pressure data using the first dynamic pressure sensor 214. One would then have sufficient data to solve the equation for a, b, and c. While not as accurate as using actual turbine inlet temperature data, the use of the heat balance to calculate the constants is accurate enough to provide useful turbine inlet temperature results 410.

As one of ordinary skill in the art will realize, other methods and systems could be used to determine the values for the constants a, b, and c and a combination of the two methods could also be employed if desired. As noted above, some gas turbine engines may be more accurately represented by different equations including higher order polynomials or equations in other forms.

It should also be noted that while the calculation system 314 has been described as determining the turbine inlet temperature using solely one of the resonant frequencies, other constructions may employ multiple resonant frequencies. In these systems, a single equation may use two or more resonate frequencies, or each resonant frequency 702 may be used in its own equation with the results being combined (e.g., averaged) to arrive at a single temperature value.

Figure 8:
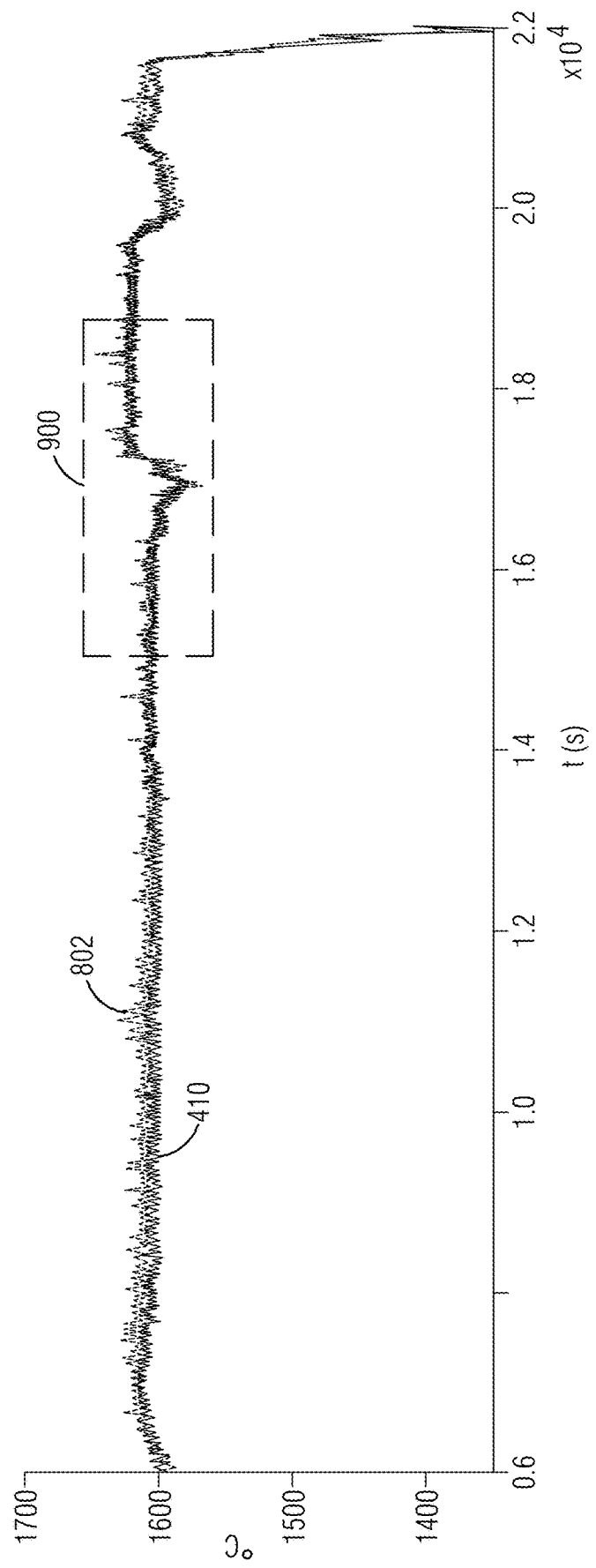
FIG. 8 is a plot comparing the turbine inlet temperature results calculated by the turbine inlet temperature calculation module to the actual measured turbine inlet temperatures.

FIG. 8 is a plot comparing the turbine inlet temperature results 410 to the actual measured turbine inlet temperatures 802. As can be seen, the error between the actual measured turbine inlet temperatures 802 and the turbine inlet temperature results 410 produced by the calculation system 314 is significant at a lower temperature value. Typically, this lower temperature value corresponds to a lower load. The operational check step 412 can be used to disable the turbine inlet temperature calculation module 400 at these lower loads to assure that the turbine inlet temperature calculation module 400 only reports turbine inlet temperature results 410 that are accurate.

With continued reference to FIG. 8, one can see that as the temperature and load increases, the accuracy of the calculated turbine inlet temperature results 410 become more accurate. For example, in one construction, the operational check step 412 verifies that the gas turbine engine 100 is operating at eighty percent or higher before initiating the turbine inlet temperature calculation module 400. Because operation at these higher temperatures is of more concern, limiting operation of the turbine inlet temperature calculation module 400 at only these higher temperatures and loads is acceptable.

Figure 9:
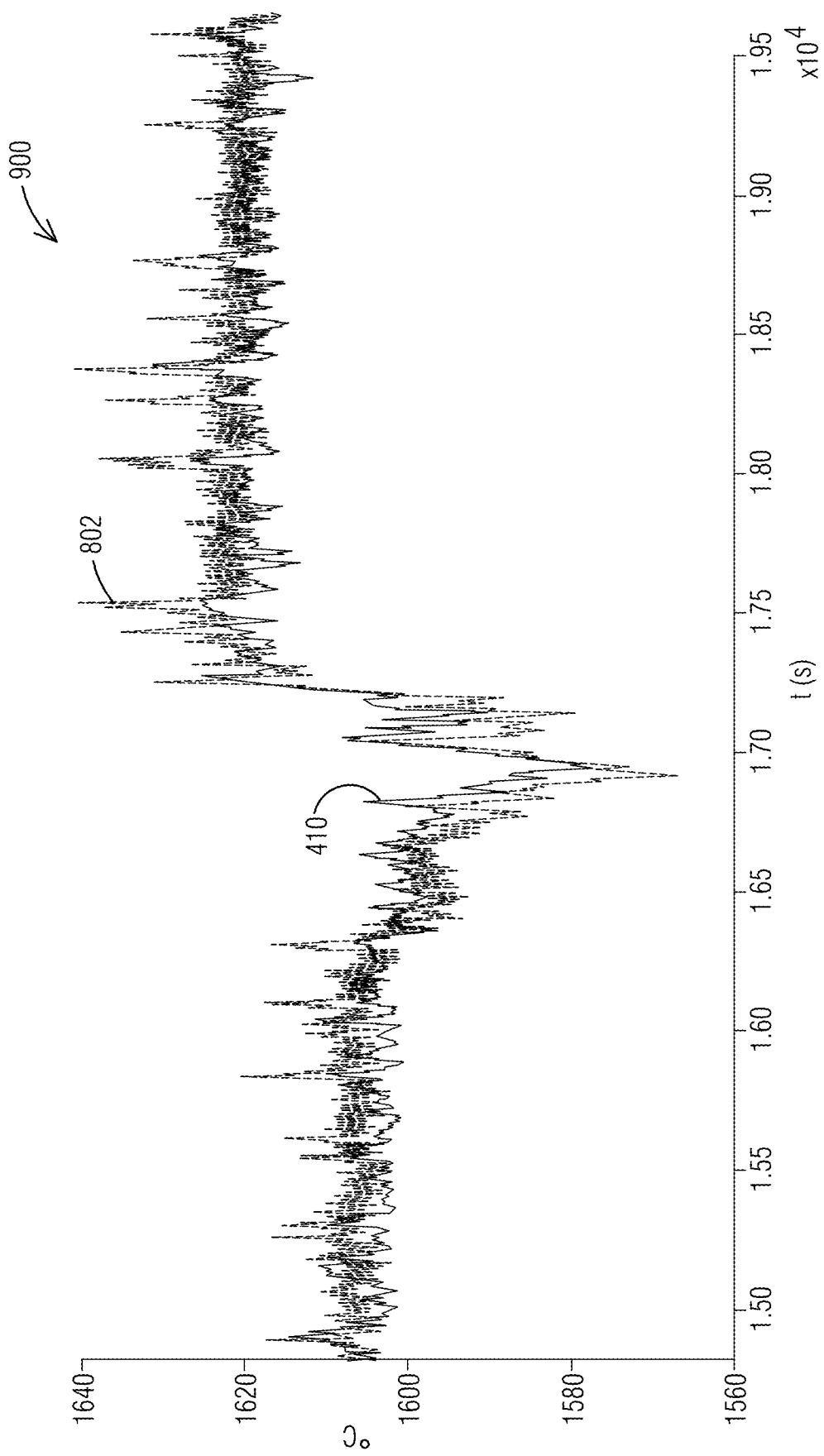
FIG. 9 is a plot showing a selected region 900 of the plot of FIG. 8.

FIG. 9 is a plot of a selected region 900 of the chart of FIG. 8 and better illustrates the accuracy of the calculation system 314. As can be seen, the calculated turbine inlet temperature results 410 are typically within a few degrees of the actual measured turbine inlet temperatures 802. In fact, even during a transient operation, such as a sudden load change the calculated turbine inlet temperature results 410 remain within a few degrees of the actual measured turbine inlet temperatures 802. FIG. 9 illustrates a sudden load reduction from about time 1.625 to time 1.7 followed by a sudden increase until about time 1.75. As can be seen, the calculated turbine inlet temperature results 410 remain within a few degrees of the actual measured turbine inlet temperatures 802 (e.g., within 5 degrees C. or within one percent of the actual value).

In operation, one gas turbine engine 100 is operated with working temperature sensors 220 in the turbine inlet 112 for each combustor 200. Operating data including frequency data and actual measured turbine inlet temperatures 802 are collected. The frequency data is directed to the computer system 314 and is analyzed by the turbine inlet temperature calculation module 400. The values of the constants a, b, and c are adjusted until the calculated turbine inlet temperature data 410 matches or closely matches the actual measured turbine inlet temperatures 802. Once a, b, and c are determined for each combustor 200, the turbine inlet temperature calculation module 400 is available for use.

During operation without the availability of the temperature sensors 220, the operational check step 412 determines if the gas turbine engine 100 is operating in a mode where the turbine inlet temperature should be calculated. If it is, the pressure data received from the isolator 306 is analyzed using the turbine inlet temperature calculation module 400 to determine the turbine inlet temperature. As discussed, each combustor 200 may have its own equation such that a turbine inlet temperature for each combustor is determined.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A method of determining a turbine inlet temperature for a gas turbine engine with a computer system, the method comprising:
    measuring pressure changes within a combustion section of the gas turbine engine during operation of the gas turbine engine to produce pressure versus time data;
    extracting a resonant frequency from the pressure versus time data; and
    calculating the turbine inlet temperature based solely on the resonant frequency and at least one constant,
    wherein prior to the calculating step, the computer system performs at least one calibration step utilizing a calibration inlet temperature to solve for the at least one constant in an equation that uses the resonant frequency and the calibration turbine inlet temperature to solve for the at least one constant.

2. The method of claim 1, wherein the extracting step comprises converting the pressure versus time data to a frequency domain to produce a frequency versus amplitude data.

3. The method of claim 2, wherein the converting step comprises calculating an auto regressive power spectral density based on the pressure versus time data.

4. The method of claim 2, wherein the extracting step comprises identifying a plurality of resonant frequencies which includes the resonant frequency from the frequency versus amplitude data and tracking the plurality of resonant frequencies versus time to generate a trace of the resonant frequency versus time.

5. The method of claim 4, wherein the trace of the resonant frequency versus time is generated using a Kalman filter that operates to fill in missing data and remove bad data.

6. The method of claim 1, wherein the calculating step comprises using the resonant frequency in a polynomial equation to calculate the turbine inlet temperature.

7. The method of claim 6, wherein the polynomial equation is a second order polynomial equation in the form, $T=af^2+bf+c$, where T is the turbine inlet temperature, f is the resonant frequency and a, b, and c are constants.

8. The method of claim 7, further comprising measuring an actual turbine inlet temperature during operation of the gas turbine engine to generate actual turbine inlet temperature versus time data and determining the values for a, b, and c by comparing the turbine inlet temperature calculated by the polynomial equation to the actual turbine inlet temperature versus time data.

9. The method of claim 7, further comprising calculating an actual turbine inlet temperature using a turbine heat balance to generate actual turbine inlet temperature versus time data and determining the values for a, b, and c by comparing the turbine inlet temperature calculated by the polynomial equation to the actual turbine inlet temperature versus time data.

10. The method of claim 1, wherein the gas turbine engine includes a plurality of combustors, and wherein the turbine inlet temperature is calculated separately for each of the plurality of combustors.

11. A method of determining a turbine inlet temperature for a gas turbine engine with a computer system, the method comprising:
    positioning a dynamic pressure sensor within a combustion section;
    positioning a temperature sensor in a position suited to measuring the turbine inlet temperature;
    measuring pressure changes with the dynamic pressure sensor to produce pressure versus time data;
    measuring the turbine inlet temperature using the temperature sensor to generate temperature versus time data;
    determining a resonant frequency based on the pressure versus time data;
    where in the computer system uses the resonant frequency and the temperature versus time data to determine the value for at least one constant in a polynomial equation during at least one calibration step; and
    after the at least one calibration step, calculating the turbine inlet temperature using the polynomial equation and based solely on the resonant frequency.

12. The method of claim 11, wherein the polynomial equation is a second order polynomial equation in the form, $T=af^2+bf+c$, where T is the turbine inlet temperature, f is the resonant frequency and a, b, and c are constants.

13. The method of claim 12, further comprising determining the values for a, b, and c by comparing the turbine inlet temperature calculated by the polynomial equation to the temperature versus time data.

14. The method of claim 11, wherein the gas turbine engine includes a plurality of combustors, and wherein the turbine inlet temperature is calculated separately for each of the plurality of combustors.

15. The method of claim 14, wherein the polynomial equation is different for each of the plurality of combustors.

16. A gas turbine engine comprising:
    a combustion section operable to combust a fuel to produce an exhaust gas;
    a turbine section coupled to the combustion section and operable to receive the exhaust gas, the turbine section defining a turbine inlet having a turbine inlet temperature;
    a dynamic pressure sensor positioned in the combustion section and operable to measure pressure fluctuations;
    a computer system coupled to the dynamic pressure sensor to receive pressure versus time data, the computer system including;
    a processor; and a memory storing instructions that, when executed by the processor, configure the apparatus to extract a resonant frequency from the pressure versus time data and calculate the turbine inlet temperature based solely on the resonant frequency, wherein prior to the calculating step, the computer system performs at least one calibration step utilizing a calibration inlet temperature to solve for at least one constant in an equation that uses the resonant frequency and the calibration turbine inlet temperature to solve for the at least one constant.

17. The gas turbine engine of claim 16, wherein the processor calculates the turbine inlet temperature using the resonant frequency in a polynomial equation.

18. The gas turbine engine of claim 17, wherein the polynomial equation is a second order polynomial equation in the form, $T=af^2+bf+c$, where T is the turbine inlet temperature, f is the resonant frequency and a, b, and c are constants.

19. The gas turbine engine of claim 16, wherein the combustion section includes a plurality of combustors, and wherein the turbine inlet temperature is calculated separately for each of the plurality of combustors.

20. The gas turbine engine of claim 19, wherein the polynomial equation is different for each of the plurality of combustors.

* * * * *